United States Patent
Golownia et al.

(10) Patent No.: US 7,388,342 B2
(45) Date of Patent: Jun. 17, 2008

(54) SYSTEM AND METHOD FOR CONTROLLING A MOTOR USING FORCED SPEED CONTROL

(75) Inventors: John J. Golownia, Hartford, WI (US); Thomas E. Simon, Cedarburg, WI (US); Peter H. Werner, Blaine, WA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 114 days.

(21) Appl. No.: 11/465,285

(22) Filed: Aug. 17, 2006

(65) Prior Publication Data

US 2008/0042604 A1 Feb. 21, 2008

(51) Int. Cl.
*H02P 7/00* (2006.01)

(52) U.S. Cl. .............. 318/432; 318/433; 318/434; 323/274; 323/284

(58) Field of Classification Search ............... 318/432, 318/433, 434; 323/274, 284
See application file for complete search history.

(56) References Cited

U.S. PATENT DOCUMENTS

| | | | | |
|---|---|---|---|---|
| 4,926,105 A | * | 5/1990 | Mischenko et al. | 318/800 |
| 5,161,393 A | * | 11/1992 | Payne et al. | 68/12.04 |
| 5,325,677 A | * | 7/1994 | Payne et al. | 68/12.04 |
| 6,424,906 B1 | | 7/2002 | Zhu et al. | |
| 6,850,021 B1 | | 2/2005 | Golownia et al. | |
| 6,982,533 B2 | | 1/2006 | Seibel et al. | |
| 7,122,993 B2 | * | 10/2006 | Bauerle et al. | 322/28 |
| 2001/0044360 A1 | * | 11/2001 | Loffler et al. | 477/107 |

* cited by examiner

*Primary Examiner*—Rita Leykin
(74) *Attorney, Agent, or Firm*—Quarles & Brady LLP; Alexander R. Kuszewski

(57) ABSTRACT

A system and method for operating a motor drive unit. The motor drive unit is coupled to a motor driving a load and is configured to selectively control the motor according to a torque control mode and a speed control mode. The motor drive unit includes a circuit configured to generate an operational condition signal indicating an operational condition of the motor and a regulator configured to receive the operational condition signal and generate a motor control signal. The motor drive unit also includes a first controller configured to receive the motor control signal and a reference control signal and select either the motor control signal or the reference control signal to use as a control signal to drive the motor according to either torque control or speed control. The motor drive unit also includes a second controller configured to monitor the operational condition signal and, upon detecting a preliminary indication of a change in the load, bypass the first controller to drive the motor according to the other of torque control or speed control.

20 Claims, 4 Drawing Sheets

SYSTEM AND METHOD FOR CONTROLLING A MOTOR USING FORCED SPEED CONTROL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to motor systems and, more particularly, to a system and method for controlling a motor over a dynamic operating range, specifically, changes between torque control and speed control.

Motors and linked loads are one type of common inductive load employed at many commercial facilities. To drive a motor, an inverter formed from a plurality of switches is controlled to link and unlink positive and negative DC buses to motor supply lines. The linking-unlinking sequence causes voltage pulses on the motor supply lines that define alternating voltage waveforms of controlled magnitude and frequency. When controlled correctly, the waveforms cooperate to generate a rotating magnetic field inside a motor stator core. In an induction motor, the magnetic field induces a field in motor rotor windings. The rotor field is attracted to the rotating stator field and; thus, the rotor rotates within the stator core. In a permanent magnet motor, one or more magnets on the rotor are attracted to the rotating magnetic field.

The inverter and control circuitry are collectively referred to as a motor drive unit. By controlling operation of these components, the motor drive unit controls the overall operation of the motor. A variety of control methods are commonly employed to control the operation of the motor. For example, two common control methods are called speed control and torque control. As suggested by the name, speed control methods seek to control the overall operation of the motor by using the speed of the motor as the control criteria. Likewise, torque control methods use the torque experienced by the motor as the primary control criteria for controlling the motor.

The particular control method employed by a motor drive unit is typically dependent upon the load associated with the motor and/or the operation/application being driven by the motor. For example, motors are commonly employed in the paper manufacturing and printing industries to move the web through various processing stages. In this case, an electronic line shaft is often employed to move the web or paper material over rollers and through various stages of the printing process. Within such applications, the motors are typically torque controlled to ensure that a proper and consistent tension is applied to the web as it is moved to each stage.

However, in most applications, there are instances when it is advantageous to switch between various control methods. For instance, with respect to the example of web fabrication or printing applications that are typically torque controlled, it is often necessary to switch from torque control to speed control or vice versa, for example, when the end of the web is reached or when a line break is experienced. That is, when the resistance presented by the web is removed, such as when the end of the web is reached or a line break is experienced, the control method is typically switched to speed control in order to avoid excessive speeds. However, since the need to change from torque control to speed control (or vice versa) is often sudden and unexpected, a motor drive unit may remain in torque control mode too long, which can result in driving the motor to an excessive over-speed that could potentially damage the associated load or product.

As a result, a variety of control algorithms, such as torque reference control methods, have been developed that seek to effectively and efficiently transition between torque and speed control methods. One such method referred to as speed limited adjustable torque (SLAT) control relies upon a min/max comparison of a torque reference to a speed regulator output to select the torque reference for the drive.

Referring to FIG. 1, a traditional system for implementing SLAT control includes a min/max torque reference control system 1. The min/max torque reference control system 1 is designed to determine the control method that should be implemented based on the current operating conditions and includes a proportional integral (PI) regulator 2 and min/max selector 3. The input to the PI regulator 2 is a speed error 4 that is calculated by a circuit that determines the difference between an application-dependent speed reference bias 5 and the actual speed of the motor delivered as a motor speed feedback 6. In this regard, the application-dependent speed reference bias 5 serves to limit the actual over- and/or under-speed that the drive unit will permit the motor to achieve should the speed limitation be removed (e.g., a line break). In this regard, the application-dependent speed reference bias 5 causes the PI regulator 2 to integrate to its maximum absolute value limit, which is then delivered as a speed regulator output (SRO) 7 to the min/max select 3.

Hence, one input to the Min/max select 3 is the SRO 7. The other input to the min/max select 3 is an external torque reference (ETR) 8. The min/max select 3 acts as a controller that selects the algebraic or absolute minimum or maximum value of SRO 7 or the ETR 8 and delivers that value as an internal torque reference (ITR) 9 for the drive based on whether it is presently configured to detect an over speed (min mode) or an under speed (max mode) condition.

However, this design is still prone to excessive speed overshoots when switching from torque control to speed control. For example, the level to which the integral term is permitted to integrate can vary significantly between products. In particular, when transitioning to speed mode, the min/max torque reference control system 1 requires that the SRO 7 slew to a value that results in the min/max select 3 selecting the ETR 8. Therefore, the amount of actual over or under speed that occurs before being controlled will vary based on the specifics of the motor drive unit and application-dependent integral time constant of the PI regulator 7.

As a result, some systems have been developed that attempt to implement a "bumpless" transition to speed control. For example, some systems have been designed that reset the integral term of the PI regulator 2 to a level that results in the SRO 7 being equal to the existing ITR 9. While this does reduce the "bumps" experienced when switching to speed control from torque control, if the speed error 4 is particularly high and the integral slew rate is relatively low, the integral term will be reset to a relatively high positive value. However, based on the application requirements and the speed error 4, a high level of negative torque may be required. In this case, due to the relatively long time constant of the integral term, the motor drive unit will cause the motor to deliver this inappropriate and potentially damaging forward torque for an extended period of time.

Therefore, it would be desirable to have a system and method for switching between control methods of a motor drive unit, such as switching between torque control and speed control, that is less prone to variations between motor drive units, motors, applications, and the like so as to provide smooth and accurate transitions between control methods.

BRIEF SUMMARY OF THE INVENTION

The present invention overcomes the aforementioned drawbacks by providing a system and method for selecting and switching the control method employed to control a motor and associated load while reducing the potential for the motor to overshoot a desired speed. In particular, the present invention provides a forced speed mode control system coupled with a "bumpless" speed regulator integrator preset that work together to provide a fast and consistent transition between torque and speed control modes while controlling speed overshoot.

In accordance with one aspect of the present invention, a motor drive unit is disclosed that is coupled to a motor driving a load and is configured to selectively control the motor according to a torque control mode and a speed control mode. The motor drive unit includes a circuit configured to generate an operational condition signal indicating an operational condition of the motor and a regulator configured to receive the operational condition signal and generate a motor control signal. The motor drive unit also includes a first controller configured to receive the motor control signal and a reference control signal and select either the motor control signal or the reference control signal to use as a control signal to drive the motor according to either torque control or speed control. The motor drive unit also includes a second controller configured to monitor the operational condition signal and, upon detecting a preliminary indication of a change in the load, bypass the first controller to drive the motor according to the other of torque control or speed control.

In accordance with another aspect of the present invention, a method is disclosed for selectively controlling a motor coupled to a load according to a torque control mode and a speed control mode. The method includes generating a speed error signal associated with the motor operating under torque control and generating a speed regulation signal from the speed error signal. The method also includes determining whether to control the motor according to the torque control mode or the speed control mode based on either a min selection criteria or a max selection criteria applied to the speed regulation signal and an external torque control signal. Additionally, the method includes monitoring the speed error signal to detect a change in polarity in the speed error signal and, upon detecting an indication of a change in the speed error signal indicating a change in the load, overriding the min selection criteria or the max selection criteria to control the motor according to the speed control mode.

In accordance with yet another aspect of the invention, a motor drive unit is disclosed that is coupled to a motor driving a load and is configured to selectively control the motor according to a torque control mode and a speed control mode. The motor drive unit includes a speed regulator configured to receive a speed error signal and generate a speed regulation signal. The motor drive unit also includes a min/max controller configured to receive the speed regulation signal and a reference torque signal and select either a minimum value or a maximum value of the speed regulation signal and the reference torque signal to use as a control signal to drive the motor according to either the speed control mode or the torque control mode. Additionally, the motor drive unit includes a state controller configured to monitor the speed error signal and, upon detecting a change the load, bypass the selection of the min/max controller to drive the motor according to the speed control mode.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 2:
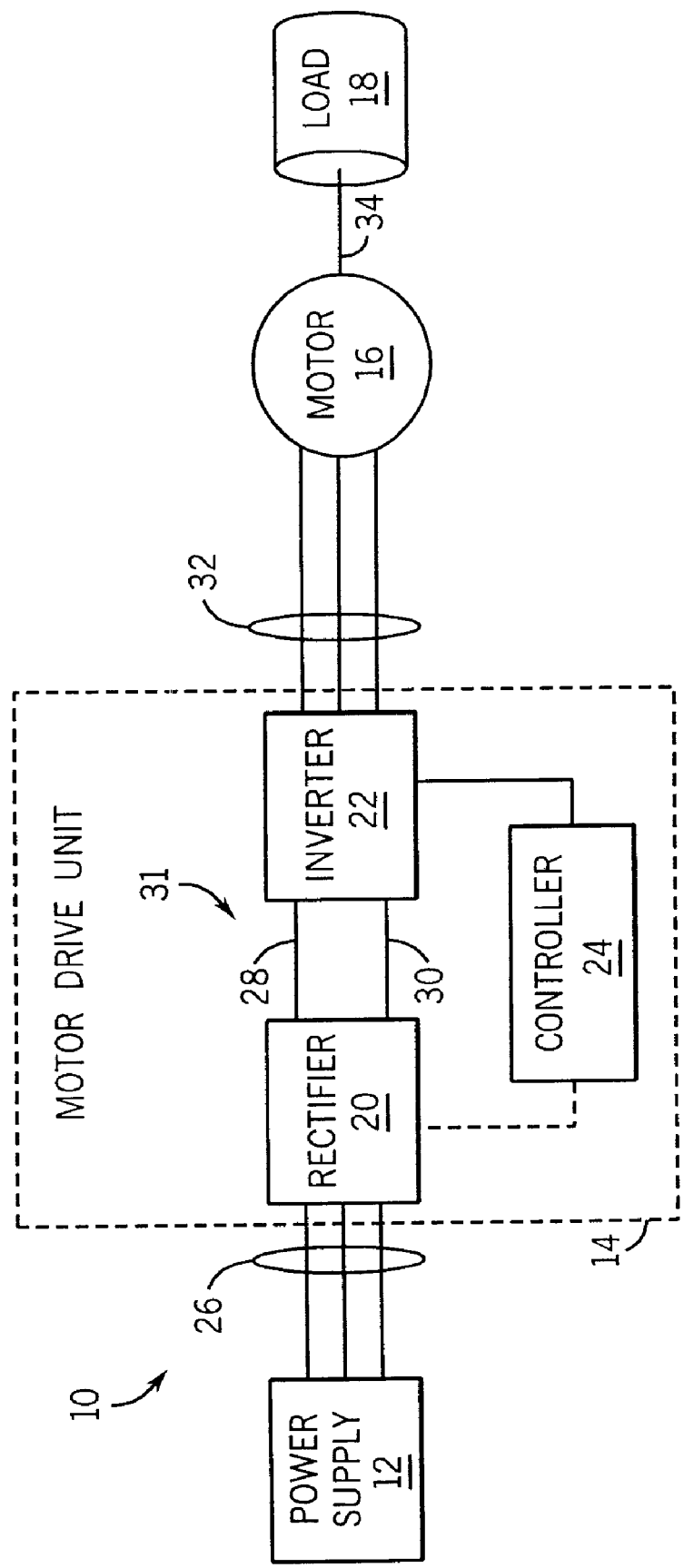
FIG. 2 is a schematic illustration of a motor system configured to control operating of a motor in accordance with the present invention.

Referring now to FIG. 2, the present invention can be described in the context of a motor system 10. The motor system 10 generally includes a power supply 12, a motor drive unit 14, and a motor 16. The power supply 12 provides power to the motor drive unit 14 that, in turn, converts the power to a more usable form for the motor 16 that drives an associated load 18.

The motor drive unit 14 includes a variety of components, such as a rectifier 20, an inverter 22, and a controller 24. During operation, the power supply 12 provides three-phase AC power, for example, as received from a utility grid over transmission power lines 26. However, it is also contemplated that the power supply 12 may deliver single-phase power. The rectifier 20 is designed to receive the AC power from the power supply 12 and convert the AC power to DC power that is delivered to positive and negative DC buses 28, 30 of a DC link 31. It is also contemplated that the power supply 12 may deliver DC power. In that case, the rectifier 20 would not be used, and the power supply 12 would connect directly to the DC link 31. The inverter 22, in turn, is positioned between the positive and negative DC buses 28, 30 to receive the DC power delivered by the rectifier 20. The inverter 22 includes a plurality of switching devices (e.g., IGBTs or other semiconductor switches) that are positioned between the positive and negative buses 28, 30 and controlled by the controller 24 to open and close specific combinations of the switches to sequentially generate pulses on each of the supply lines 32 to drive the motor 16 and, in turn, the load 18 through a drive shaft 34.

Figure 1:
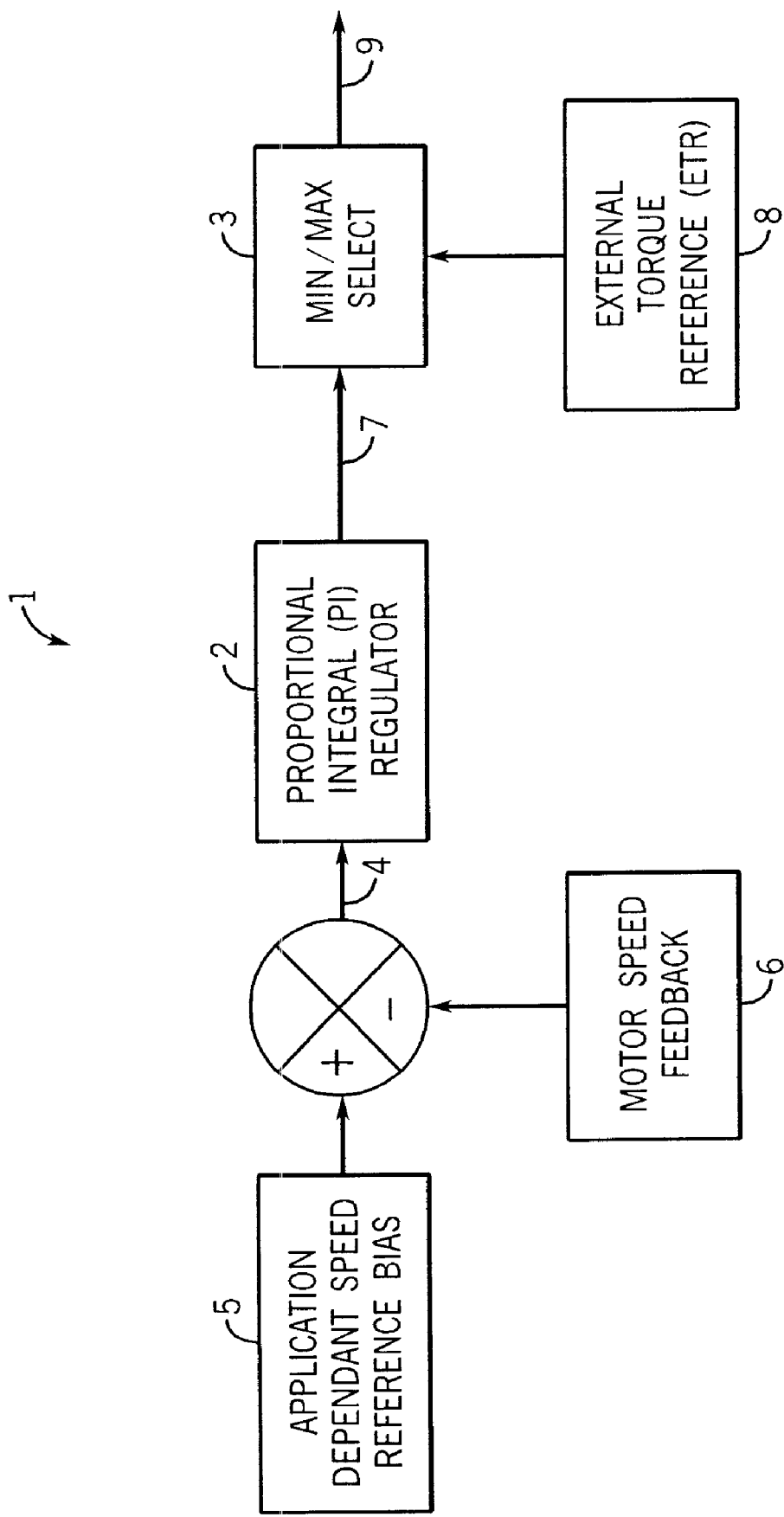
FIG. 1 is a schematic diagram of a prior-art control system for implementing a min/max torque reference control.
Figure 3:
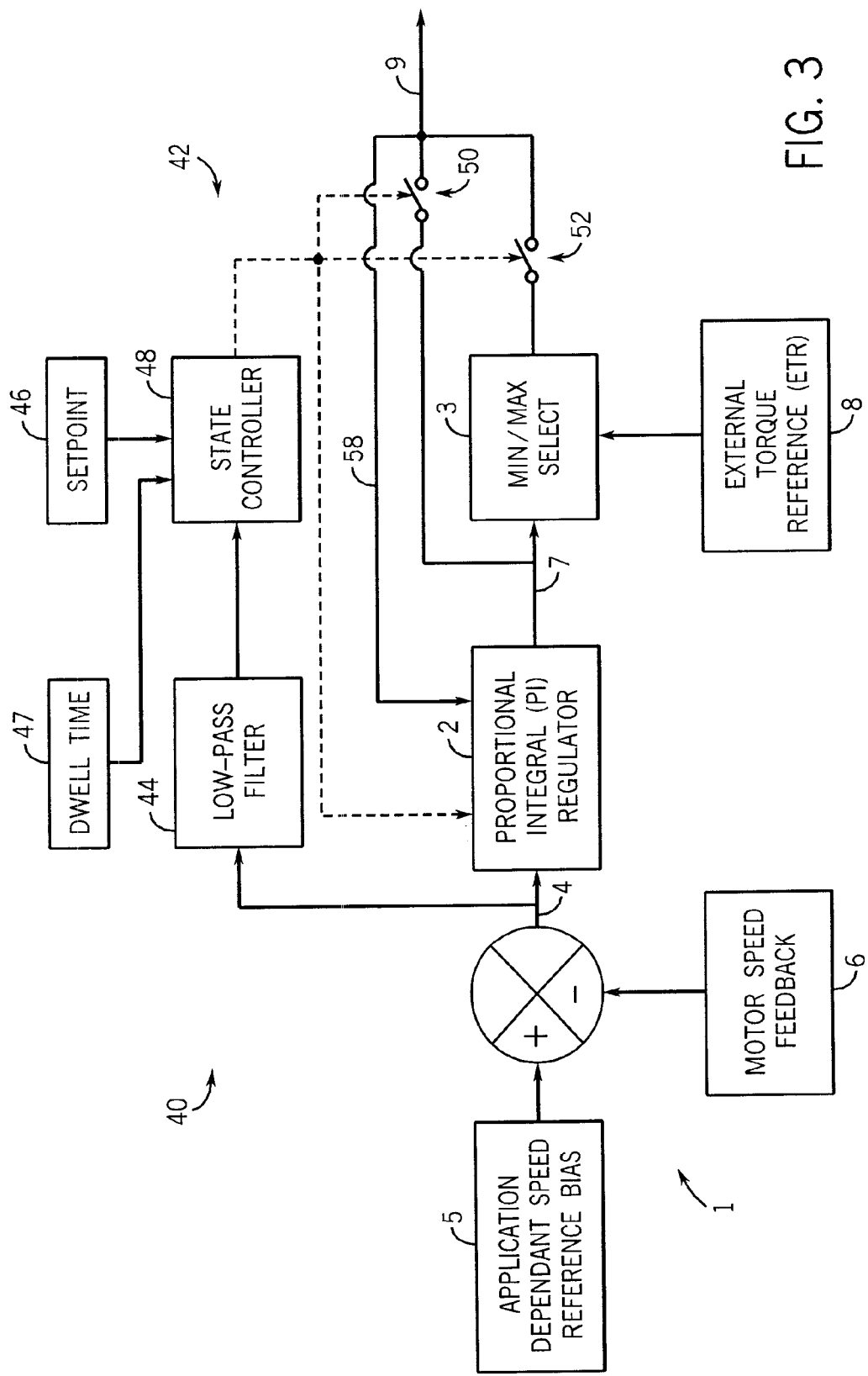
FIG. 3 is a schematic diagram of a control system for implementing a forced speed mode based on a set of criteria.

The above-described system 10 can be controlled according to any of a variety of control methods. Referring now to FIG. 3, a system 40 is illustrated for controlling the above-described motor system 10 to operate according to a speed limited adjustable torque (SLAT) control method with a forced speed mode. In particular, the system 40 includes two subsystems. The first subsystem includes the component of the prior-art SLAT control system 1 described above with respect to FIG. 1. In addition to the components described above with respect to FIG. 1, the system 40 includes a subsystem 42 of components for implementing a forced speed mode.

Figure 5:
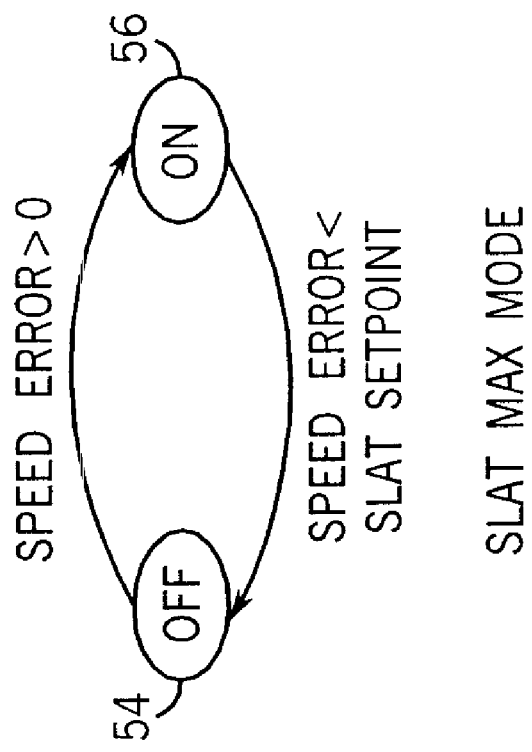
FIG. 5 is a state diagram of the control system of FIG. 3 when operating according to a max mode.

The forced speed mode subsystem 42 includes a low-pass filter 44 that, along with a user-selected setpoint input 46 and dwell time 47, form inputs to a state controller 48. Based upon these inputs 44, 46, 47, the state control 48 controls a pair of switches 50, 52 that set the ITR 9 to the value selected by the min/max select 3 or bypass the min/max select 3 to set the ITR 9 to the value of SRO 7. Hence, as will be described, by bypassing or overriding the min/max select 3 to set the ITR 9 to the value of SRO 7, the system 40 enters a forced speed mode (FSM). Additionally, as will be described, these components work in concert to monitor the direction of the applied torque and the material movement and select a SLAT min operational mode (FIG. 4) or SLAT Max operational mode (FIG. 5). Thus, the system 40 is capable of operating according to two different operational modes (SLAT min or SLAT max) and, within each operational mode, the system 40 is capable of operating in two different states (FSM "OFF" or "ON").

Figure 4:
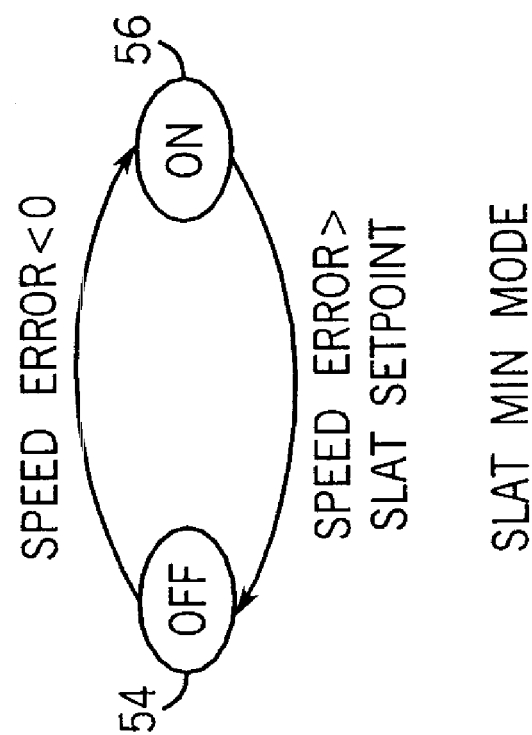
FIG. 4 is a state diagram of the control system of FIG. 3 when operating according to a min mode.

Referring now to FIGS. 3 and 4, when the system 40 is operating in SLAT min mode, the user-configured speed reference bias 5 serves to force the PI regulator 2 into saturation because the speed reference bias 5 is generally slightly above the motor speed feedback 6. In this case, the min/max select 3 (operating as a min select) sets the ITR 9 to the value of the ETR 8. As such, the system operates in a traditional torque control mode (i.e. FSM OFF state 54) as long as there is no significant change in the load driven by the motor, for example, a breakage or slippage in the load.

That is, by default, when operating in SLAT min mode, the system 42 is in a torque reference mode 54 where FSM is OFF 54. Hence, the system 40 will remain in the FSM OFF state 54 until one of two conditions cause the system to transition into the speed reference mode (FSM ON state 56). The first condition occurs when the SRO 7 from the PI regulator 2 becomes less than the ETR 8. This condition causes the system to transition to the FSM ON state 56 based on the selection of the min/max select 3 in the manner described with respect to in FIG. 1.

The second condition occurs when the speed error 4 becomes negative because the motor speed feedback 6 becomes greater than the speed reference bias 5. This results in a change in the polarity of the speed error signal 4, which is often indicative of a mechanical change in the load driven by the motor, such as a line break or the like in continuous web applications. However, as described above, such a change is often not sufficient to cause the min/max select 3 to transition to the system 40 into speed control until after the motor has already reached an undesired overspeed condition.

However, in the present system 40, a change in the load manifested through a change in polarity of the speed error signal 4 will cause the state controller 48 to initiate a transition to the FSM ON state 56 by closing the first switch 50 and opening the second switch 52. This sets the ITR9 to the SRO 7, which effectuates a transition to the speed control. By using a change in the polarity of the speed error 4 from positive to negative as a new criteria for determining that operating under speed control would be beneficial and bypassing the control of the min/max select 3 to force the drive to enter the FSM ON state 56, the transition occurs earlier than it would have in a system operating in a traditional min torque mode, such as described above with respect to FIG. 1. Accordingly, the potential velocity overshoot indicated by the increase in motor speed feedback 6 (for example, as a result of a line break in a continuous web) is reduced.

Additionally, in accordance with one embodiment, when the system 40 switches from FSM OFF state 54 (torque mode) to FSM ON state 56 (speed mode), the PI regulator 7 is loaded with the value of the ITR 9 via a feedback line 58 to create a smooth transition between the states 54, 56. In particular, the state controller 48 causes the PI regulator 2 to match the integral term to the value communicated over the feedback line 58.

Once the load fault or potential load fault has been rectified, in order for the system 40 to switch from the FSM ON state 56 to the FSM OFF state 54, forced speed mode (if active) must first be turned off. When the min/max select 3 is operating in SLAT min mode, the setpoint input 46 determines the amount of variation between the motor speed feedback 6 and the speed reference bias 5 that will be tolerated by the state controller 48 before transitioning to the FSM OFF state 54. On the other hand, the dwell time input 47 determines the duration for which the speed error 4 must exceed setpoint input 46 before the state controller 48 transitions to the FSM OFF state 54.

Therefore, the state controller 48 will transition from FSM ON state 56 to the FSM OFF state 54 when the speed error 4 is greater than the value at the setpoint input 46 for at least the value at the dwell time input 47. It is contemplated that under default parameter settings, this transition will occur when the speed error 4 becomes positive. However, the setpoint input 46 and dwell time input 47 allow a user to select a desired hysteresis for transitioning to the FSM OFF state 54. By default, these inputs 46, 47 can be set to zero so that there is no hysteresis injected into the system 40.

In the example of a paper winder or other continuous web application, the system 40 is typically set to operate in SLAT min mode. Therefore, the system normally runs in a traditional torque mode and follows the ETR 8. In a paper or other web feeding application, the ETR 8 is typically provided by an external controller and is approximately 60% motor torque during a particular snapshot. The speed reference bias 5 is also provided by an external controller and is set just above the value of the motor speed feedback 6 in order to saturate the PI regulator 2 while in torque mode.

That is, when operating under SLAT min control, the application dependent speed reference bias 5 is set to a level that results in the SRO 7 magnitude becoming saturated when the motor speed feedback 6 is constrained as a result of the speed of the motor being mechanically limited. The active "min" select function will then cause the min/max select 3 to select the smaller ETR 8 value over the SRO 7. Hence, the speed error 4 will be positive in value. Therefore, the default state in the SLAT min mode is the FSM OFF state 54, whereby the ITR 9 is set to the smaller of either the SRO 7 or the ETR 8. This state is also utilized when the PI regulator 2 is disabled.

Should a web break occur (or, generally, the mechanical speed limitation be removed), the motor will accelerate and the speed error 4 will become negative. At this time, the state controller 48 will cause the system 40 to enter the FSM ON state 56 by connecting the ITR 9 to the SRO 7. This is achieved by closing the first switch 50 and opening the second switch 52 (regardless of the value of the ETR 8). Coincident with the transition into the FSM ON state 56, a preset operation will occur within the PI regulator's 2 functional specification by connecting the PI regulator 2 to the ITR 9 and; thereby, forcing the integral term of the PI regulator 2 to match the ITR 9 value.

The system 40 will remain in the FSM ON state 56 until the speed limitation is restored, as indicated by the speed error 4 exceeding the value of the setpoint input 46 for the duration set by the value of the dwell time input 47. When these two conditions are met, the system transitions to the FSM OFF state 54 and the traditional "min" select operation becomes active.

Referring now to FIGS. 3 and 5, the system 40 may also operate in a SLAT "max" mode. In this configuration, the controlled system will typically operate as a holdback against an overhauling lead section. SLAT max mode can be used to accommodate applications that require operation in a reverse torque direction. For reverse torque operation, the speed reference bias 5, ETR 8 and ITR 9 are all negative quantities. In SLAT max mode, the system 40 is typically configured to have a speed reference bias 5 that forces the PI regulator 2 into saturation (i.e., the speed reference bias 5 is set to a value slightly more negative than the value of motor speed feedback 6). As a result, the SRO 7 is more negative than the ETR 8. Accordingly, the min/max select 3, which is now configured to select the maximum of either SRO 7 or ETR 8, sets the ITR9 to the ETR 8 until there is a breakage or slippage in the application.

In SLAT max mode, the system 40 will switch from the FSM OFF state 54 (torque mode) to the FSM ON state 56 (speed mode) when one of the two conditions occur. First, a state transition will occur when the SRO 7 from the PI regulator 2 is more positive than the ETR 8. The system 40 will naturally transition into speed control through the max selection made by the min/max select 3, as described above with respect to FIG. 1.

Second, a state transition also will occur when the speed error 4 becomes positive (i.e., when the motor speed feedback 6 becomes more negative than the speed reference bias 5). While such a change may not typically be sufficient to trigger a change to speed control using the min/max select 3, the state controller 48 is designed to utilize such as a new control criteria to cause the system 40 to enter speed mode (FSM ON 56). In this case, the transition to speed mode occurs earlier than it would have in a traditional max torque mode and the potential for a velocity overshoot is reduced. At the time that the drive switches from the FSM OFF state 54 (torque mode) to FSM ON state 56 (speed mode), the integral term of the PI regulator 2 is loaded with the value from the ITR 9 to create a smooth transition between torque and speed mode.

Again, in order for the system 40 to switch back from speed mode to torque mode, FSM (if active) must first be turned off. When transitioning back from the FSM ON state 56 to the FSM OFF state 54, the setpoint input 46 sets how much greater the motor speed feedback 6 should be than the speed reference bias 5 before the state controller 48 causes a transition to the FSM OFF state 54. In this case, the dwell time input 47 sets the duration for which the speed error 4 must fall below the value of the setpoint input 46 before the state controller 48 causes a transition to the FSM OFF state 54. Hence, under the SLAT max mode, the setpoint input 46 and the dwell time input 47 allow a user to set a hysteresis for transitioning to the FSM OFF state 54. In accordance with one embodiment, it is contemplated that the inputs 46, 47 will be set to zero as a default. With these default parameter settings, the transition will occur when the speed error 4 becomes negative; however, it is contemplated that the values of the inputs 46, 47 can be user selectable.

Therefore, the max mode operation (FIG. 5) is similar to the min mode operation (FIG. 4) except that the signs of the values reviewed for transition decisions are inverted. That is, the active "max" select function will select the larger value of the SRO 7 or the ETR 8. In the example of a continuous web application, since the SRO 7 value will be a negative quantity, when the motor speed is mechanically overhauled, the SRO 7 is a saturated (limited) negative value. Therefore, though the ETR 8 also has a negative value, the ETR 8 is smaller in magnitude than the SRO 7. Hence, the ETR 8 is selected by the min/max select 3 operating under the "max" operation.

Since the speed error 4 will be negative in value, the system will transition to the FSM ON state 56 when the speed error 4 becomes positive. As was the case in min mode operation, the integral term of the PI regulator 2 is set to the value of the ITR 9 in conjunction with this transition. When the speed error 4 becomes negative again, and less than the value of the setpoint input 46 for the duration indicated by the dwell time input 47, the system transitions to the FSM OFF state 54 and the traditional "max" select operation becomes active.

Therefore, the above-described traditional SLAT min mode and SLAT max mode are improved upon by including a forced speed mode. The system is particularly advantageous in applications that require a smooth transition from a torque mode to a speed mode of operation. For example, it is contemplated that the above-described system can be used with web handling applications, center winder systems, center unwind systems, or other systems and applications where a significant change in torque, such as caused by a break or slippage, may occur.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

We claim:

1. A motor drive unit coupled to a motor driving a load and configured to selectively control the motor according to a torque control mode and a speed control mode, the motor drive unit comprising:
    a circuit configured to generate an operational condition signal indicating an operational condition of the motor;
    a regulator configured to receive the operational condition signal and generate a motor control signal;
    a first controller configured to receive the motor control signal and a reference control signal and select a first of the motor control signal and the reference control signal to use as a control signal to drive the motor according to a first of torque control and speed control;
    a second controller configured to monitor the operational condition signal and, upon detecting a preliminary indication of a change in the load, bypass the first controller to drive the motor according to a second of torque control and speed control.

2. The motor drive unit of claim 1 wherein the first controller is a min/max selector and wherein the second controller is a state controller configured to override the first controller to force the motor drive unit to control the motor according to the speed control mode.

3. The motor drive unit of claim 1 wherein the second controller is configured to bypass the first controller when the operational condition signal changes polarity.

4. The motor drive unit of claim 1 wherein the second controller includes a state controller having at least a forced speed mode on state and a forced speed mode off state.

5. The motor drive unit of claim 4 wherein, when the operational condition signal changes polarity, the second controller is configured to transition to the forced speed mode on state and bypass the first controller, and wherein, when the operational condition signal has a value that is one of greater than and less than a predetermined value, the second controller is configured to transition to the forced speed mode off state.

6. The motor drive unit of claim 5 wherein the predetermined value is based on a predetermined time interval selected for the motor to be speed controlled.

7. The motor drive unit of claim 6 wherein the predetermined value and the predetermined time interval are user selectable.

8. The motor drive unit of claim 1 wherein the load includes a system configured to drive a continuous web.

9. The motor drive unit of claim 1 wherein the operational condition signal includes a motor speed error signal.

10. The motor drive unit of claim 1 wherein the regulator includes an integrator that is periodically reset to an internal torque reference value of the motor drive unit upon the second controlling ending the bypass of the first controller.

11. The motor drive unit of claim 1 further comprising a low-pass filter configured to filter the operational condition signal prior to delivering the operational condition signal to the second controller.

12. A method for selectively controlling a motor coupled to a load according to a torque control mode and a speed control mode, the method comprising the steps of:
 (a) generating a speed error signal associated with the motor operating under torque control;
 (b) generating a speed regulation signal from the speed error signal;
 (c) determining whether to control the motor according to one of the torque control mode and the speed control mode based on one of a min selection criteria and a max selection criteria applied to the speed regulation signal and a external torque control signal;
 (d) monitoring the speed error signal to detect a change in polarity in the speed error signal; and
 (e) upon detecting a change in the speed error signal indicating a change in the load, overriding the min selection criteria and the max selection criteria to control the motor according to the speed control mode.

13. The method of claim 12 further comprising:
 (f) comparing the speed error signal to a predetermined value to determine when the speed error signal is one of greater and less than the predetermined value; and
 (g) upon determining that the speed error signal is the one of greater and less than the predetermined value, returning to step (c).

14. The method of claim 13 wherein step (g) includes delaying returning to step (c) until expiration of a user-defined delay period.

15. The method of claim 12 wherein the change in the speed error signal indicating the change in the load is a change in polarity of the speed error signal.

16. A motor drive unit coupled to a motor driving a load and configured to selectively control the motor according to a torque control mode and a speed control mode, the motor drive unit comprising:
 a speed regulator configured to receive a speed error signal and generate a speed regulation signal;
 a min/max controller configured to receive the speed regulation signal and a reference torque signal and select one of a minimum value and a maximum value of the speed regulation signal and the reference torque signal to use as a control signal to drive the motor according to one of the speed control mode and the torque control mode; and
 a state controller configured to monitor the speed error signal and, upon detecting the speed error signal indicating a change in the load, bypass the selection of the min/max controller to drive the motor according to the speed control mode.

17. The motor drive unit of claim 16 further comprising a comparison circuit configured to compare a speed reference bias to an actual motor speed signal to generate the speed error signal.

18. The motor drive unit of claim 16 wherein the state controller is configured to return control to the min/max controller upon detecting a change in the speed error signal within a predetermined tolerance.

19. The motor drive unit of claim 18 wherein the predetermined tolerance includes the speed error raising above a user-definable setpoint when the min/max selector is operating in a min mode and the speed error dropping below a user-definable setpoint when the min/max selector is operating in a max mode.

20. The motor drive unit of claim 18 wherein the state controller is further configured to set an internal torque reference value of the speed regulator when returning control to the min/max controller.

* * * * *